United States Patent
Bockes et al.

(10) Patent No.: US 7,983,414 B2
(45) Date of Patent: Jul. 19, 2011

(54) PROTECTED CRYPTOGRAPHIC CALCULATION

(75) Inventors: Markus Bockes, München (DE); Hermann Drexler, München (DE); Helmut Kahl, München (DE)

(73) Assignee: Giesecke & Devrient GmbH, Munich (DE)

( * ) Notice: Subject to any disclaimer, the term of this patent is extended or adjusted under 35 U.S.C. 154(b) by 763 days.

(21) Appl. No.: 10/527,570

(22) PCT Filed: Sep. 9, 2003

(86) PCT No.: PCT/EP03/10015
§ 371 (c)(1),
(2), (4) Date: Mar. 10, 2005

(87) PCT Pub. No.: WO2004/032411
PCT Pub. Date: Apr. 15, 2004

(65) Prior Publication Data
US 2006/0050868 A1 Mar. 9, 2006

(30) Foreign Application Priority Data

Sep. 11, 2002 (DE) .................................. 102 42 061
Oct. 31, 2002 (DE) .................................. 102 50 810

(51) Int. Cl.
*H04L 9/28* (2006.01)
(52) U.S. Cl. .......................................... 380/28; 380/44
(58) Field of Classification Search .................... 380/28, 380/30, 44; 713/176, 168, 180
See application file for complete search history.

(56) References Cited

U.S. PATENT DOCUMENTS

| 4,405,829 | A | * | 9/1983 | Rivest et al. | ..................... 380/30 |
| 4,924,514 | A |   | 5/1990 | Matyas et al. | |
| 5,390,196 | A | * | 2/1995 | Cecil et al. | ..................... 714/781 |
| 5,533,126 | A |   | 7/1996 | Hazard | |
| 5,675,649 | A |   | 10/1997 | Brennan et al. | |
| 5,799,086 | A | * | 8/1998 | Sudia | .............................. 705/76 |
| 5,991,415 | A | * | 11/1999 | Shamir | ........................... 380/30 |

(Continued)

FOREIGN PATENT DOCUMENTS

DE  689 26 005 T2  10/1996

(Continued)

OTHER PUBLICATIONS

D. Boneh et al., "On the Importance of Checking Cryptographic Protocols for Faults," *Advances in Cryptology—EUROCRYPT '97, LNCS 1233*, pp. 37-51 (1997) (XP-002202745).

(Continued)

*Primary Examiner* — Eleni A Shiferaw
(74) *Attorney, Agent, or Firm* — Martine Penilla & Gencarella, LLP

(57) ABSTRACT

In a method for protected execution of a cryptographic calculation in which a key with at least two key parameters is drawn on, an integrity check of the key is performed, in order to prevent a cryptographic attack in which conclusions are drawn as to at least one second key parameter by corrupting at least one first key parameter. A further method serves to determine a key for a cryptographic calculation with at least two key parameters provided for use in the first-mentioned method. A computer program product and a portable data carrier have corresponding features. The methods enable particularly good protection of cryptographic calculations against attacks.

20 Claims, 4 Drawing Sheets

U.S. PATENT DOCUMENTS

| | | | |
|---|---|---|---|
| 6,052,469 A * | 4/2000 | Johnson et al. | 380/286 |
| 6,914,983 B2 * | 7/2005 | Chen et al. | 380/28 |
| 6,934,887 B1 | 8/2005 | Baldischweiler | |
| 6,959,091 B1 * | 10/2005 | Sabin | 380/286 |
| 6,965,673 B1 * | 11/2005 | Boneh et al. | 380/28 |
| 7,227,947 B2 * | 6/2007 | Seysen | 380/30 |
| 7,248,700 B2 * | 7/2007 | Seifert et al. | 380/282 |
| 7,415,110 B1 * | 8/2008 | Lee | 380/44 |
| 2003/0061498 A1 * | 3/2003 | Drexler et al. | 713/189 |
| 2003/0097628 A1 * | 5/2003 | Ngo et al. | 714/736 |
| 2003/0196096 A1 * | 10/2003 | Sutton | 713/181 |
| 2005/0005147 A1 | 1/2005 | Fischer et al. | |
| 2005/0084096 A1 * | 4/2005 | Joye et al. | 380/28 |

FOREIGN PATENT DOCUMENTS

| | | |
|---|---|---|
| EP | 0 365 065 | 2/1990 |
| EP | 0 798 892 | 10/1997 |
| GB | 2 270 446 | 3/1994 |
| WO | WO 98/37525 | 8/1998 |
| WO | WO 01/48974 | 7/2001 |
| WO | WO 01/61918 | 8/2001 |
| WO | WO 03/034649 | 4/2003 |

OTHER PUBLICATIONS

F. Bao et al., "Breaking Public Key Cryptosystems on Tamper Resistant Devices in the Presence of Transient Faults", *Proc. of 5<sup>th</sup> Int'l Workshop on Security Protocols*, 1997, pp. 115-124, ISBN 3-540-64040-1.

G. Ateniese et al., "New Multiparty Authentication Services and Key Agreement Protocols," *IEEE Journal on Selected Areas in Communications*, vol. 18, No. 4, Apr. 2000, pp. 628-639.

Sun Microsystems, Inc., "Java Card™ 2.1.1, Application Programming Interface," 2000, Palo Alto, CA, USA (220 total pages).

V. Klima et al., "Attack on Private Signature Keys of the OpenPGP format, PGP™ programs and other applications compatible with OpenPGP," Mar. 2001, pp. 1-20.

W. Fung et al., "Protection of Keys against Modification Attack," *Proc. 2001 IEEE Symposium on Security and Privacy*, May 2001, pp. 26-36.

C. Aumüller et al., "Fault Attacks on RSA with CRT: Concrete Results and Practical Countermeasures," *Proc. 4th Int'l Workshop on Cryptographic Hardware and Embedded Systems (CHES 2002 )*, Aug. 2002, pp. 260-275.

W. Rankl et al.; "Smart Card Handbook," 3$^{rd}$ Ed., John Wiley & Sons, Ltd., 2003, pp. 168-175 and 550-556.

\* cited by examiner

PROTECTED CRYPTOGRAPHIC CALCULATION

BACKGROUND OF THE INVENTION

1. Field of the Invention

The invention relates in general to the technical domain of cryptography and more especially to a procedure for improved protection of a cryptographic calculation against attacks. The invention is provided in particular for use in portable data carriers, which can be configured as smart cards in different forms of construction or as chip modules, for example.

2. Description of the Related Art

The RSA method, described, e.g. in U.S. Pat. No. 4,405,829, is well known for the exchange of encrypted and/or signed data. According to the RSA method, a public key is used for encryption or signature verification and a secret private key for decryption or signature generation. Security of the RSA method is based on the fact that currently no efficient way of determining the prime factors p and q of a large number n with $n = p \cdot q$ is known. Whereas the so-called modulus n is published as part of the public key, the values p and q must be kept secret.

The calculation processes required for executing the RSA method are relatively complicated. For instance, the data to be processed have to be exponentiated with parameters of the private key during decryption or signature generation, for example. In particular for portable data carriers with their limited computing power, an implementation of the RSA method for decryption or signature generation is therefore frequently employed which uses the CRT (Chinese remainder theorem) and therefore is also designated as RSA-CRT method. By using the RSA-CRT method the required computing expenditure is reduced by approximately the factor 4.

The RSA-CRT method provides, instead of one complicated power calculation, to perform two far simpler exponentiations, the results of which are then combined into the decrypted data or the generated signature. Only the secret prime factor p enters into the first of these calculations and only the secret prime factor q into the second calculation.

Attack scenarios have been proposed, in which exactly one of the two named RSA-CRT calculation branches is interfered with, e.g. by deliberate action of heat or radiation or by electrical pulses. If this succeeds, a multiple of the prime factor p, q, whose calculation branch has not been interfered with can be derived from the result of the overall calculation. In other words, conclusions can be drawn as to the private key by means of the described attack. This has potentially catastrophic consequences, because not only the decryption or signature generation just performed, but all the cryptographic operations executed using the private key are compromised.

The attack just mentioned is known by the name "fault attack" or "Bellcore attack" and described, e.g., in column 4 of U.S. Pat. No. 5,991,415. Likewise in U.S. Pat. No. 5,991,415 a method is disclosed, in which an additional factor j enters into the calculation to protect against this attack which takes place during the cryptographic calculation. However, as will be shown below, there are further possibilities of attack, against which nothing can be done by the method known from U.S. Pat. No. 5,991,415.

Said possibility of attack is particularly critical if the cryptographic calculation is executed by a processor of a portable data carrier, for example a smart card or a chip module. A first reason for this is that portable data carriers of this kind are often used for security-critical applications, e.g. in connection with financial transactions, access control or the signature of legally binding documents. Secondly, portable data carriers are typically in the possession of the attacker while the cryptographic calculation is being executed, so this person has every opportunity to influence the calculation and to spy on the results of the calculation.

SUMMARY OF THE INVENTION

An object of the invention is to provide a technique for particularly good protection of cryptographic calculations against attacks. A further object of the invention is to prevent attacks based on similar principles to the "Bellcore attack" described above. Yet a further object in preferred configurations of the invention is that the protection according to the invention should advantageously cooperate with other protection methods.

According to the invention, the above objects are completely or partly achieved by a method for protected execution of a cryptographic calculation in which a key with at least two key parameters is drawn on, wherein an integrity check of the key is performed in order to prevent a cryptographic attack in which conclusions are drawn as to at least one second key parameter by corrupting at least one first key parameter.

Further according to the invention, the above objects are completely or partly achieved by a method for determining a key for a cryptographic calculation with at least two key parameters, the key being adapted to be used in a method for protected execution of a cryptographic calculation wherein an integrity check of the key is performed in order to prevent a cryptographic attack in which conclusions are drawn as to at least one second key parameter by corrupting at least one first key parameter.

Further according to the invention, the above objects are completely or partly achieved by a computer program product which has program commands to cause a processor to execute a method for protected execution of a cryptographic calculation, in which a key with at least two key parameters is drawn on, wherein an integrity check of the key is performed in order to prevent a cryptographic attack in which conclusions are drawn as to at least one second key parameter by corrupting at least one first key parameter.

Further according to the invention, the above objects are completely or partly achieved by a portable data carrier set up for executing a method for protected execution of a cryptographic calculation, in which a key with at least two key parameters is drawn on, wherein an integrity check of the key is performed in order to prevent a cryptographic attack in which conclusions are drawn as to at least one second key parameter by corrupting at least one first key parameter.

The order in which the method steps are listed in the claims should not be interpreted as a limitation of the range of protection; rather, configurations of the invention are provided, in which these method steps are executed completely or partly in a different order or completely or partly parallel or completely or partly interleaved.

The invention starts from the fundamental awareness that an attack similar to the above-described Bellcore attack is possible not only owing to interference with the calculation processes during the cryptographic calculation, but also by the cryptographic calculation being supplied with incorrect parameters. This can be done, for example, by transferring a false pointer address to the calculation routine, or by an external alteration of the contents of memory fields in which key parameters are contained. The inventors have realized that conclusions as to key parameters which need to be kept secret may possibly be drawn from the result of a cryptographic calculation supplied with parameters corrupted in this way.

According to the invention it is provided, to protect against an attack of this kind, to execute an integrity check of the key drawn on for the cryptographic calculation. By this measure the attack can be identified and defended against, in that, e.g. the cryptographic calculation is terminated without issuing a result. The integrity check cannot normally rule out manipulation of the key parameters with absolute certainty; however, it should provide protection against said attack which is adequate for practical purposes. This implies that a simple range check with a fixed lower limit and a fixed upper limit would not be regarded as an integrity check in the sense of the present invention.

The integrity check is preferably configured in such a way that a manipulation in which a monitored key parameter is corrupted in a random way is identified with a probability bordering on certainty, e.g. with a probability greater than $1-10^{-3}$ or greater than $1-10^{-6}$ or greater than $1-10^{-9}$. While the integrity check in many configurations comprises only individual, particularly critical key parameters, it is preferably provided to monitor all the parameters of a key which needs to be kept secret. Different test methods can be executed in this case for individual parameters or groups of parameters in the course of the integrity check.

The methods used for the integrity check are in each case aimed at identifying corruption of the monitored key parameter or the monitored key parameters. In a preferred configuration, the integrity check effectively determines whether a key parameter is within a range of valid values, wherein the range is non-contiguous in that it has a plurality of gaps. This type of testing usually exists if the key parameter has been calculated during key generation from the value actually required for the cryptographic calculation and an additional, per se redundant safeguard value, as is the case, e.g. with checksum calculations.

While it can be provided that many or all of the key parameters are checked individually in each case, it is preferably determined in the integrity check whether at least two key parameters are in a predetermined relationship to one another. The integrity check can include a multiplicative operation, which in the wording of the present document includes multiplication, division, exponentiation, a modulo calculation and a divisibility test.

It is preferably checked whether a key parameter or a value derived from it is evenly divisible by a safeguard value. In this case the key parameter is preferably extracted during key generation by multiplying the value actually required for the cryptographic calculation by the safeguard value. The safeguard value may be a component of the key or permanently preset.

The method according to the invention is suitable for all cryptographic calculations in which a cryptographic attack enables conclusions as to at least one second key parameter by corruption of at least one first key parameter. The invention is provided in particular for safeguarding the decryption or signature generation in an RSA method, preferably in an RSA-CRT method. In these cases the integrity check relates to the private RSA key. Corresponding possibilities of attack are expected to be found for further cryptographic calculations, which can then likewise be safeguarded in the manner according to the invention.

In preferred configurations, in the integrity check it is determined whether an exponent used in an exponentiation operation is evenly divisible by a safeguard value. These embodiments of the invention can be particularly advantageously combined with an exponent-masking method, as known from the international publication document WO 01/48974 A1. In further advantageous configurations the prime factors of the RSA method are multiplied by a masking parameter—alternatively or additionally to the exponent masking just mentioned—so that the result of the calculation can be checked for accuracy by means of an equality check modulo the masking parameter.

The computer program product according to the invention has program commands to implement the method according to the invention. A computer program product of this kind may be a physical medium, for example a semi-conductor memory or a diskette or a CD-ROM, on which a program for executing a method according to the invention is stored. The computer program product may, however, also be a non-physical medium, for example a signal communicated via a computer network. The computer program product may be provided in particular for use in connection with the production and/or initialization and/or personalization of smart cards or other data carriers.

In preferred configurations the computer program product and/or the portable data carrier are further developed with features corresponding to the above-described features and/or those mentioned in the dependent method claims.

BRIEF DESCRIPTION OF THE DRAWINGS

Further features, advantages and objects of the invention emerge from the following detailed description of several embodiment examples and embodiment alternatives. Reference is made to the schematic drawings.

DETAILED DESCRIPTION OF EMBODIMENTS OF THE INVENTION

Figure 1:
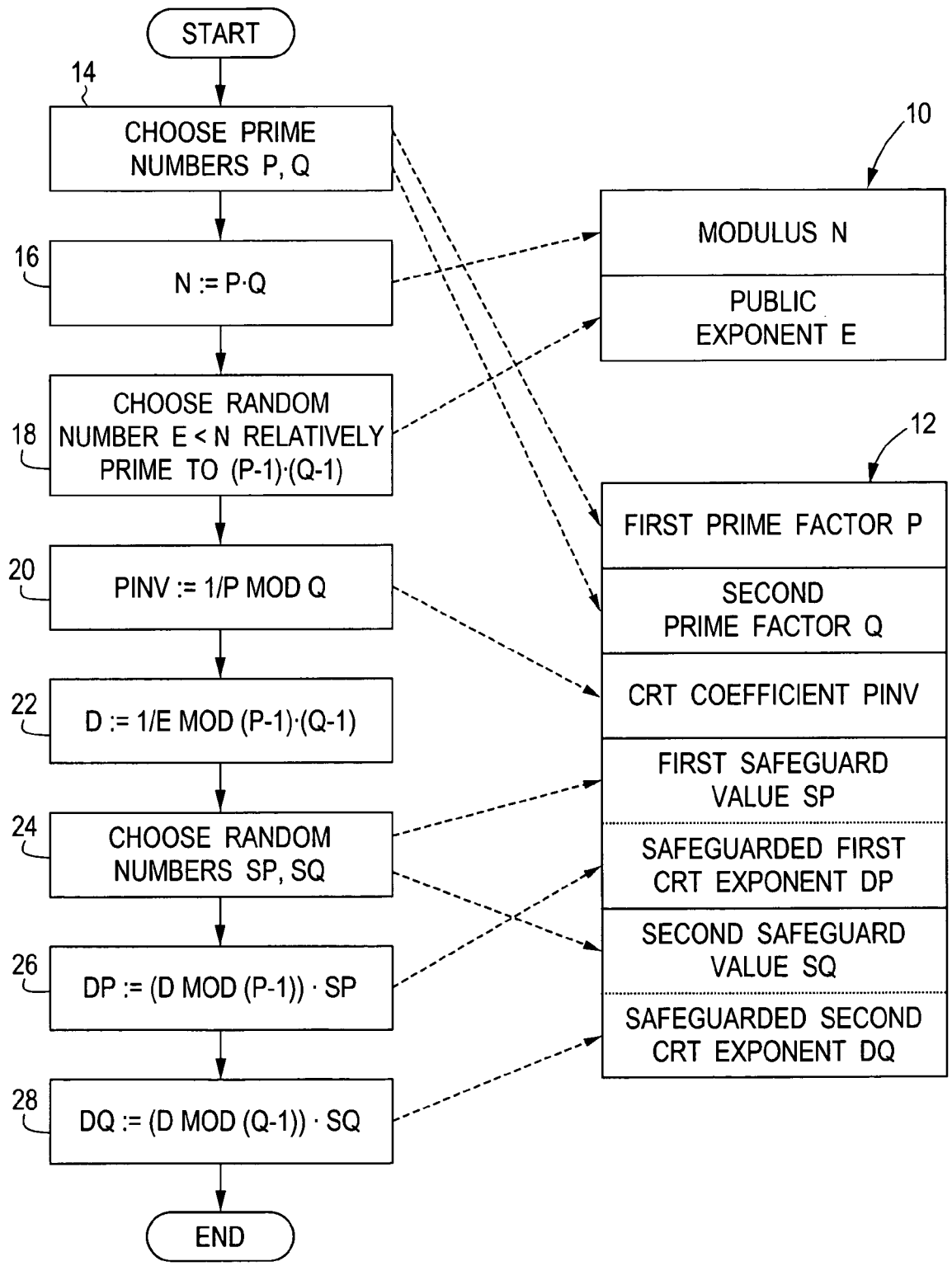
FIG. 1 shows an example of a flow diagram of a method for key calculation, illustrating a public and a private key.

The method illustrated in FIG. 1 serves for calculating a public key 10 and a private key 12, which are configured for use in an RSA method. The dotted arrows indicate in each case which key parameter is generated by which method step. In connection with use of the pair of keys 10, 12 by portable data carriers (e.g. smart cards), the method can be executed in a secured environment, e.g. in the course of the initialization or personalization of the data carrier. The externally calculated pair of keys is then transmitted into the data carrier as part of the initialization or personalization data. It is alternatively possible for the method of FIG. 1 to be executed by the data carrier itself, in order to determine the pair of keys.

The public key 10 has as key parameters a modulus n and a public exponent e. The private key 12 is provided for RSA calculations using the Chinese remainder theorem, also designated here as RSA-CRT calculations. The private key 12 has as key parameters a first and a second prime factor p, q, a CRT coefficient pinv, a first and a second safeguard value sp, sq and also a safeguarded first and a safeguarded second CRT exponent dp, dq.

The method illustrated in FIG. 1 begins in a way known per se in step 14 with the random choice of two prime numbers with a length of, e.g. 1024 or 2048 bits each, which are stored in the private key 12 as the first and second prime factors p, q. In the following step 16 the modulus n of the public key 10 is calculated as the product of the two prime factors p, q. The public exponent e is determined in step 18 as a random number, which is relatively prime to the value (p−1)·(q−1). As in the present embodiment example the private key 12 is tailored to RSA-CRT calculations, in step 20 the modular inverse of p modulo q is calculated and entered into the private key 12 as the CRT coefficient pinv.

In step 22 the value d is calculated as the modular inverse of the public exponent e modulo (p−1)·(q−1). In RSA methods which do not use the Chinese remainder theorem d, as the private exponent, would be the main component of the private key. In known RSA-CRT methods the two CRT exponents d mod (p−1) and d mod (q−1) would be used instead of d. In the present embodiment example the private key 12, on the other hand, contains values derived from said CRT exponents d mod (p−1) and d mod (q−1) by an additional safeguarding measure. This safeguarding measure is in this case, by way of example, the multiplication by one safeguard value in each case. Manipulation of the safeguarded values can be detected by a divisibility check. In embodiment alternatives other safeguarding measures are provided, e.g. a checksum formation or multiple passing of at least the important parameters to be passed.

Two random numbers with a length of, for example, 64 bits (8 bytes) each are generated in step 24 as safeguard values sp, sq. The safeguarded first CRT exponent dp is calculated in step 26 according to dp:=(d mod (p−1))·sp. Correspondingly, the safeguarded second CRT exponent dq is determined in step 28 by the calculation dq:=(d mod (q−1))·sq. Said values are all stored as parameters of the private key 12. This ends the determination of a private key 12 protected against manipulation.

In the present embodiment example the private key 12 substantially exists in the form of a data structure RSAPrivateCRTKey according to the conventions of the Java Card application programming interface. These conventions are described in the document "Java Card™ 2.1.1 Application Programming Interface", Revision 1.0, 18 May 2000, published by Sun Microsystems, Inc., USA, currently available at http://java.sun.com/products/javacard/javacard21.html. The data structure provided there has fields DP1 and DQ1 for the unsafeguarded CRT exponents d mod (p−1) and d mod (q−1). In order to accommodate the private key 12 according to the present embodiment example in a data structure of this kind, it is provided in the present embodiment example that the values sp and dp are stored together in the field DP1 of the RSAPrivateCRTKey and that correspondingly the values sq and dq are stored together in the field DQ1. In FIG. 1 this is indicated by dotted lines. In embodiment variants the values sq and dq can also be stored in other fields of the RSAPrivateCRTKey or outside this data structure.

The embodiment examples described here differ slightly from the above-mentioned Java Card specification insofar as in the present case the modular inverse of p modulo q is contained in the private key 12 as CRT coefficient pinv. According to the Java Card specification, on the other hand, a CRT coefficient PQ is used which is the modular inverse of q modulo p. Modifications of the method described here are provided, in which the CRT coefficient PQ corresponding to the Java Card specification is a component of the private key 12. The ideas according to the invention can also be used for configurations of this kind without substantial alteration.

Figure 2:
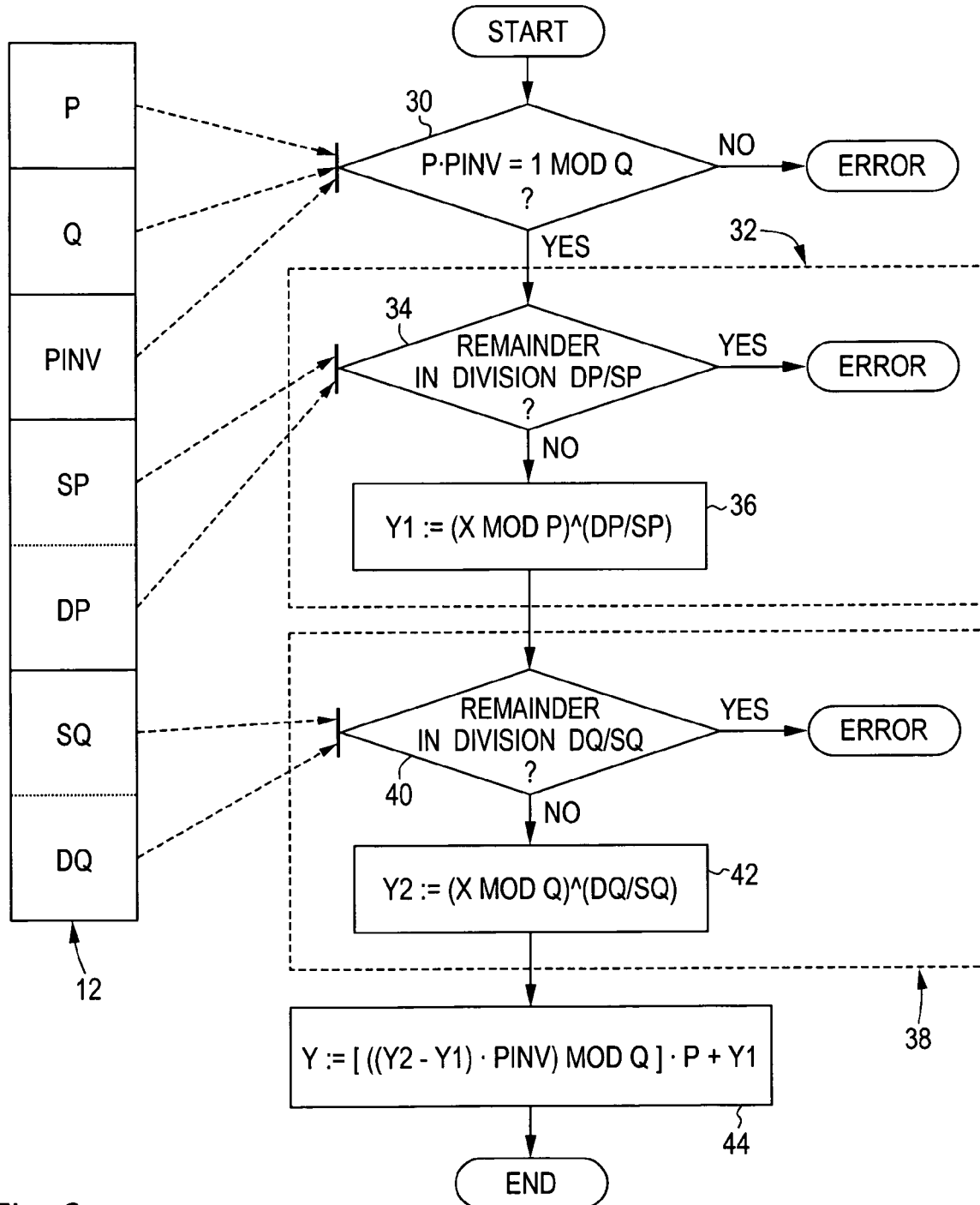
FIG. 2 shows an example of a flow diagram of a cryptographic calculation method.

FIG. 2 shows a first configuration of a safeguarded RSA-CRT method which serves for decryption or signature generation. The method is provided to be executed by a processor of a portable data carrier, in particular a smart card or a chip module. The method is for this purpose implemented in the form of program commands for this processor, stored in a ROM or EEPROM of the data carrier. The private key 12 required for decryption or signature generation is likewise stored in the EEPROM of the data carrier.

When the method is invoked, a pointer to the private key 12 is transferred to the invoked decryption or signature generation routine. The inventors have recognized that a cryptographic attack can be executed in that individual parameters of the private key 12 are manipulated before the start of the decryption or signature generation. This can be done, e.g. by deliberate action on the EEPROM containing the private key 12 or by transferring an incorrect address to the RSA-CRT routine. An attack of this kind would have the extremely disadvantageous consequence that conclusions could be drawn from the result of the calculation—e.g. the decrypted data or the generated signature—as to the values of the secret key parameters. This would compromise the pair of keys 10, 12 for all previous and future calculations.

In order to prevent a cryptographic attack of this kind, in the method of FIG. 2 an integrity check of the private key 12 is provided, which includes a series of several partial tests. In FIG. 2 the dotted arrows indicate which key parameters enter into the respective partial tests.

The method begins in step 30 with the partial test as to whether the CRT coefficient pinv contained in the private key 12 does actually represent the modular inverse to the first prime factor p modulo the second prime factor q. In other words it is checked whether the fixed relationship p·pinv=1 mod q has been fulfilled. If this is not the case, an error jump takes place and the method is terminated. If the check is successful, it can be assumed that the key parameters p, q and pinv have not been manipulated and the method is continued.

In the calculation module 32, which now follows, a first auxiliary value y1 is determined as the result of the first of the two CRT calculation branches. The data x to be decrypted or signed, the first prime factor p and the first CRT exponent d mod p−1 enter into this calculation, wherein the latter value is not directly available, but has to be derived from the safeguarded first CRT exponent dp and the first safeguard value sp.

To check whether one of the two values sp, dp has been manipulated, firstly in step 34 a divisibility check is performed. If the safeguarded first CRT exponent dp is not evenly divisible by the first safeguard value sp, an error jump and termination of the method takes place again. If, on the other hand, the division comes out without remainder, it can be assumed with probability bordering on certainty that at least no random corruption of one of the two key parameters sp and dp has taken place. This divisibility check represents only a small additional computing expenditure, as the safeguard value sp has only a relatively small bit length. Deliberate manipulation of the two parameters sp and dp with knowledge of the safeguarding mechanism provided could not, of course, be discovered by the method described here; though it is not currently imaginable how an attacker could bring about deliberate writing of this kind of new values into individual EEPROM cells of the data carrier.

If the integrity check with respect to parameters sp and dp in step 34 was successful, in step 36 the actual calculation of the first auxiliary value y1 is executed according to y1:=(x mod p)^(dp/sp). With respect to the exponent dp/sp it is of course normally possible to have recourse to the result of the division already calculated in step 34. As the safeguarding method in the present embodiment example simply consisted of multiplication by the first safeguard value sp—see step 26 in FIG. 1—dp/sp=d mod (p−1) applies and thus y1=(x mod p)^(d mod (p−1)). This is the desired result of the first CRT calculation branch.

A second calculation module 38 corresponds to the second CRT calculation branch. The method operates in the same way as in the first calculation module 32, wherein, however, the second prime factor q, the second safeguard value sq and the safeguarded second CRT exponent dq are drawn on. In step 40 the integrity check in respect of key parameters sq and dq follows again and in step 42 the second auxiliary value y2 is calculated according to the formula y2:=(x mod q)^(dq/sq).

In calculation step 44 concluding the method the overall result y, in other words the decrypted data or the calculated signature, is determined in a way known per se by combining the two CRT auxiliary values y1 and y2. The calculation performed here can be expressed as a formula as y:=(((y2−y1)·pinv) mod q)·p+y1. Different evaluation sequences can of course be chosen for the calculation steps performed by the processor of the data carrier. Different variants of the RSA-CRT calculations of steps 36, 42 and 44 are generally known from the literature, which differ in particular in the way in which interim results are reduced to the respective modulo ranges. The idea according to the invention of the integrity check and the multiplicative safeguarding of the CRT exponents dp and dq proposed in the present embodiment example can be combined with all these variants.

The integrity check according to the present invention is directed in particular against a cryptographic attack which is executed chronologically before the RSA calculations—at the latest during passing of the parameters to the RSA routine. The check during passing of the parameters can also be done in a simple manner in that, as well as the parameters to be passed, redundant information related thereto, for example in the form of checksums, is also stored and, after the parameters have been passed, a stored checksum is compared with a checksum which has been newly calculated from the passed parameters. Alternatively, at least important parameters to be passed can be multiply passed and checked for identity after passing.

Further methods of attack are known, which aim at spying out the individual calculation steps in order to enable conclusions as to the key parameters which need to be kept secret. The exponent formation in steps 36 and 42 is particularly exposed to such attacks, because with normal implementations of the exponentiation operation the processor activity during the course of calculation depends considerably on the bit sequence of the exponent. This processor activity can be spied out by measuring the power consumption (SPA=simple power analysis or DPA=differential power analysis) or other signals, such as, e.g. electrical field strengths.

To protect against attacks of this kind, it was proposed in international patent publication WO 01/48974 A1 to divide the exponent with remainder by a random number and, instead of a single exponentiation operation, to perform three separate exponentiations, wherein the whole-number quotient, the random number and the remainder determined during the division are used as exponents. This method is described in detail in said patent publication, the contents of which are hereby fully incorporated into the present document.

It is a particular advantage of the safeguarding method according to the present invention that it can easily be combined with the masking method designated as "exponent blinding" according to WO 01/48974 A1, wherein the division required in any case for the masking method can also be used for the safeguarding method according to the present invention. The method according to the invention can in this way be implemented with very little extra expenditure.

Figure 3:
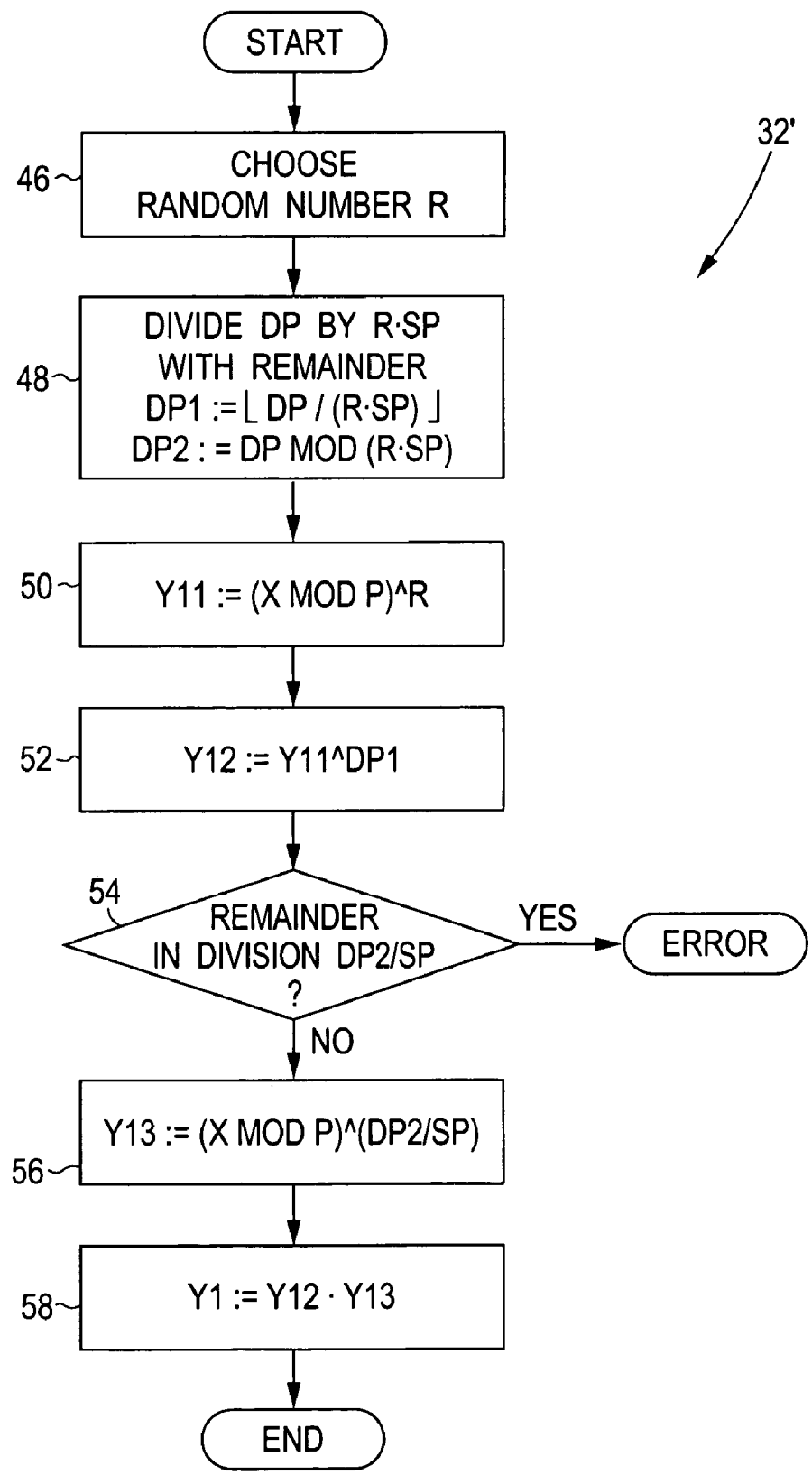
FIG. 3 shows an example of a flow diagram of a detail of the method of FIG. 2 in a modified configuration.

FIG. 3 shows the method steps of a calculation module 32', which is modified in respect of calculation module 32 of FIG. 2 in such a way that it additionally applies the technique of exponent blinding known per se from WO 01/48974 A1. For this, firstly in step 46 a random number r with a length of, for example, 64 bits (8 bytes) is chosen. In step 48 a division with remainder is performed, to divide the safeguarded CRT exponent dp into the factors dp1 and r·sp and the remainder dp2; dp=dp1·r·sp+dp2 applies. In contrast to the method known from WO 01/48974 A1, in step 48 the value r·sp is therefore used as divisor, and not the random number r.

In steps 50 and 52 the first two exponentiation operations are now performed, in that the basic value x mod p is first exponentiated by the random number r and the thus obtained interim result y11 is then exponentiated by the whole-number quotient dp1. For the result y12, y12=((x mod p)^r)^dp1=(x mod p)^(r·dp1) thus applies. The safeguard value sp has not entered into steps 50 and 52, as to this extent the multiplication serving to safeguard the CRT exponent dp has already been reversed in connection with the division 48.

In step 54 a divisibility check now takes place—analogously to step 34 in FIG. 2—to ensure the integrity of the key parameters sp and dp. In contrast to step 34 in FIG. 2, here, however, it is not the safeguarded CRT exponent dp that is divided by sp, but the division remainder dp2. As dp2 differs from dp only by a multiple of r·sp—and thus by a multiple of sp—the two checks are of equal value. The calculation expenditure arising from execution of step 54 is, however, considerably less than in the calculation of step 34 in FIG. 2, owing to the far shorter dividend dp2. Moreover, the whole-number division result dp2/sp is required in the following step 56. The division and divisibility check in step 54 represents in comparison with the known method according to WO 01/48974 A1 the only additional computing expenditure.

If dp2 is not an even multiple of sp, the method is terminated in step 54 by an error jump. Otherwise, in step 56 a further interim value y13 is calculated according to y13:=(x mod p)^(dp2/sp). The product y12·y13 is determined in step 58 as the result y1 of calculation module 32'. This result is identical to the first auxiliary value y1 according to step 36 of FIG. 2, because:

$$y1 = y12 \cdot y13$$
$$= ((x \bmod p)\wedge(r \cdot dp1)) \cdot ((x \bmod p)\wedge(dp2/sp))$$
$$= (x \bmod p)\wedge((r \cdot dp1) + (dp2/sp))$$
$$= (x \bmod p)\wedge(dp/sp)$$

applies.

The entire RSA-CRT method in the particularly protected embodiment variant described here starts with an integrity check of parameters p, q and pinv by step 30 shown in FIG. 2. This is followed by the steps of calculation module 32' according to FIG. 3 as first CRT calculation branch, in order to determine the first auxiliary value y1. The method shown in FIG. 3 is likewise used to calculate the second auxiliary value y2, wherein, of course, the key parameters p, sp and dp are replaced by q, sq and dq. The random number r can either be taken over from the first course of the calculation module 32' or newly determined. The final result y is finally calculated by combining the two auxiliary values y1 and y2, as in step 44 of FIG. 2.

Figure 4:
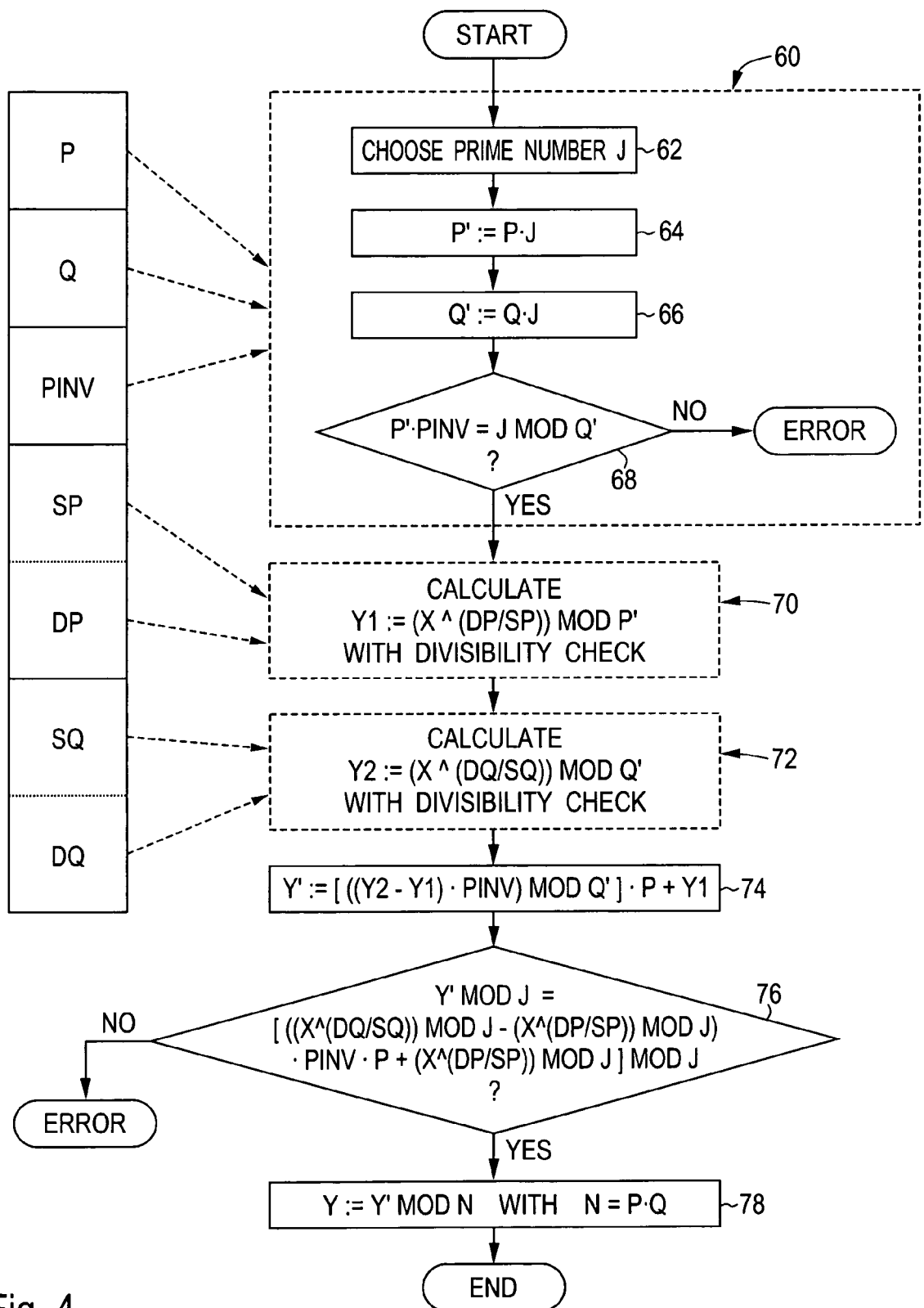
FIG. 4 shows an example of a flow diagram of a further embodiment example of the cryptographic calculation method.

The method shown in FIG. 4 provides an additional checking step, in which a further masking parameter j is drawn on.

A first calculation block 60 corresponds approximately to step 30 in FIG. 2. In step 62 the masking parameter j is chosen as a random prime number with a length of, for example, 32 bits (4 bytes). The prime factors p and q are multiplied by the masking parameter j in steps 64 and 66 to obtain masked prime factors p' or q'. In step 68 a test takes place to check the integrity of key parameters p, q and pinv. If p'·pinv=j mod q' applies, the method is continued; otherwise an error jump takes place.

In a second calculation block 70 a first auxiliary value y1 is determined according to the formula y1:=(x^(dp/sp)) mod p'. The first auxiliary value y1 substantially corresponds to the first auxiliary value of the embodiment examples of FIG. 2 and FIG. 3, wherein, however, p' is drawn on instead of p for the modulo calculation. In detail the calculation takes place in different embodiment variants either as in calculation module 32 of FIG. 2 or as in calculation module 32' of FIG. 3. In both cases a divisibility check is performed to ensure the integrity of key parameters sp and dp.

A third calculation block 72 corresponds to the second calculation block 70 with the difference that instead of dp, sp and p', the values dq, sq and q' are drawn on to calculate a second auxiliary value y2. Again the third calculation block 72 can be configured either like calculation module 38 in FIG. 2 or analogously to the representation in FIG. 3. The integrity of key parameters sq and dq is checked by a divisibility test in the third calculation block 72.

Step 74 relates to the calculation of an interim result y' according to the formula y':=[((y2−y1)·pinv) mod q']·p+y1. This corresponds approximately to step 44 in FIG. 2. In step 76 a further test takes place, which relates the calculations so far to one another and identifies interfered with calculation sequences. It is checked whether the following equality relationship modulo j applies:

$$y' \bmod j = [((x^{(dq/sq)}) \bmod j - (x^{(dp/sp)}) \bmod j) \cdot pinv \cdot p + (x^{(dp/sp)}) \bmod j] \bmod j$$

If this equation is not fulfilled, an error termination takes place. Otherwise, the method is concluded in step 78 with the calculation of the final result y according to y:=y' mod n, wherein n is the modulus with n=p·q. Even greater improved protection against cryptographic attacks is achieved in the method according to FIG. 4 by further checking of the calculation sequence in step 76.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

What is claimed is:

1. A method for protected execution of a cryptographic calculation, in which a key with at least two key parameters is drawn on, wherein the key is a private RSA key for use in an RSA method, wherein each key parameter is a private RSA key parameter contained in the private RSA key, wherein an integrity check of the private RSA key is performed in order to prevent a cryptographic attack in which conclusions are drawn as to at least one second private RSA key parameter by corrupting at least one first private RSA key parameter, wherein the cryptographic calculation is one of a decryption in the RSA method and a signature generation in the RSA method, and wherein each operation of the method for protected execution of the cryptographic calculation is executed by an integrated circuit.

2. The method as claimed in claim 1, wherein in the integrity check it is determined whether the value of at least one private RSA key parameter is contained in a range of valid values, wherein the range is non-contiguous in that it has a plurality of gaps.

3. The method as claimed in claim 1, wherein in the integrity check it is determined whether at least two private RSA key parameters are in a predetermined relationship to one another.

4. The method as claimed in claim 1, wherein the integrity check includes a multiplicative operation, in particular a divisibility test.

5. The method as claimed in claim 1, wherein in the integrity check it is checked whether at least one of the private RSA key parameters is evenly divisible by a safeguard value.

6. The method as claimed in claim 1, wherein in the integrity check it is checked whether at least one value which differs from one of the private RSA key parameters by a multiple of a safeguard value is evenly divisible by the safeguard value.

7. The method as claimed in claim 1, wherein in the integrity check a checksum stored with the private RSA key parameters is compared with a checksum newly calculated after passing of the private RSA key parameters.

8. The method as claimed in claim 1, wherein, to check the integrity, important parameters to be passed are multiply passed and checked for identity after passing.

9. The method as claimed in claim 1, wherein the RSA method is an RSA-CRT method.

10. The method as claimed in claim 1, wherein in the cryptographic calculation at least one exponentiation operation is performed and in the integrity check it is checked whether the exponent used in the exponentiation operation is evenly divisible by a safeguard value.

11. The method as claimed in claim 10, wherein in the cryptographic calculation an exponent blinding method is applied for protection against spying.

12. The method as claimed in claim 1, wherein the prime factors of the RSA method are multiplied by a masking parameter and an error freedom of the calculation sequence is checked by an equality check modulo the masking parameter.

13. The method as claimed in claim 1, wherein at least one private RSA key parameter is the product of a value required for the cryptographic calculation times a safeguard value, and wherein the integrity check includes a divisibility check.

14. A method for determining a key for a cryptographic calculation with at least two key parameters, wherein the key is a private RSA key for use in an RSA method, and wherein each key parameter is a private RSA key parameter contained in the private RSA key, the key being adapted to be used in a method for protected execution of a cryptographic calculation wherein an integrity check of the private RSA key is performed in order to prevent a cryptographic attack in which conclusions are drawn as to at least one second private RSA key parameter by corrupting at least one first private RSA key parameter, wherein the cryptographic calculation is one of a decryption in the RSA method and a signature generation in the RSA method, and wherein each operation of the method for determining the private RSA key for the cryptographic calculation is executed by an integrated circuit.

15. The method as claimed in claim 14, wherein at least one private RSA key parameter is obtained by multiplication of a value required for the cryptographic calculation by a safeguard value.

16. The method as claimed in claim 14, wherein at least one private RSA key parameter is the product of a value required for the cryptographic calculation times a safeguard value, and wherein the integrity check includes a divisibility check.

17. A computer program product including a computer-readable storage medium, the computer readable storage medium being a physical medium and having a computer program stored thereon, the computer program including program commands to cause a processor to execute a method for protected execution of a cryptographic calculation, in which a key with at least two key parameters is drawn on, wherein the key is a private RSA key for use in an RSA method, wherein each key parameter is a private RSA key parameter contained in the private RSA key, wherein an integrity check of the private RSA key is performed in order to prevent a cryptographic attack in which conclusions are drawn as to at least one second private RSA key parameter by corrupting at least one first private RSA key parameter, and wherein the cryptographic calculation is one of a decryption in the RSA method and a signature generation in the RSA method.

18. The computer program product as claimed in claim 17, wherein at least one private RSA key parameter is the product of a value required for the cryptographic calculation times a safeguard value, and wherein the integrity check includes a divisibility check.

19. A portable data carrier comprising a processor and a storage, the storage having a computer program stored thereon, the computer program including program commands to cause the processor to execute a method for protected execution of a cryptographic calculation, in which a key with at least two key parameters is drawn on, wherein the key is a private RSA key for use in an RSA method, wherein each key parameter is a private RSA key parameter contained in the private RSA key, wherein an integrity check of the private RSA key is performed in order to prevent a cryptographic attack in which conclusions are drawn as to at least one second private RSA key parameter by corrupting at least one first private RSA key parameter, wherein the data carrier is one of a smart card and a chip module, and wherein the cryptographic calculation is one of a decryption in the RSA method and a signature generation in the RSA method.

20. The portable data carrier as claimed in claim 19, wherein at least one private RSA key parameter is the product of a value required for the cryptographic calculation times a safeguard value, and wherein the integrity check includes a divisibility check.

* * * * *